United States Patent [19]

Hestad

[11] 3,865,978

[45] Feb. 11, 1975

[54] NODE CONTROL CIRCUITRY

[75] Inventor: Alfred Hestad, Chicago, Ill.

[73] Assignee: Control Networks Corporation, Chicago, Ill.

[22] Filed: June 21, 1973

[21] Appl. No.: 372,099

[52] U.S. Cl. .......... 179/18 GF

[51] Int. Cl. .......... H04m 7/06

[58] Field of Search .......... 179/18 GE, 18 GF

[56] References Cited

UNITED STATES PATENTS

| | | | |
|---|---|---|---|
| 3,251,036 | 5/1966 | Smith | 179/18 GF |
| 3,585,310 | 6/1971 | Gueldenpfenning | 179/18 GF |
| 3,646,368 | 2/1972 | Mills | 179/18 GF |
| 3,655,918 | 4/1972 | Marbury et al. | 179/18 GF |

*Primary Examiner*—Kathleen H. Claffy
*Assistant Examiner*—Gerald L. Brigance
*Attorney, Agent, or Firm*—Alter Weiss Whitesel & Laff

[57] ABSTRACT

A node control circuit for use in controlling cross points in multi-stage networks. The control circuitry tests every possible path through the network, cuts through the path that successfully traverses all stages, holds the connection and blocks busy verticals. The circuitry includes a constant current source for the use in the operation of a node control circuitry which enables the use of lower voltage levels, improves the current control for the switching device used and eliminates voice attenuation. A further feature includes the utilization of a square wave generator in conjunction with counter-scanning equipment for use in activating and deactivating the node control circuitry. The utilization of the square wave generator in combination with the counter acts to block and prevent fan out through the circuitry.

10 Claims, 3 Drawing Figures

NODE CONTROL CIRCUITRY

This invention relates to path selection systems for use in selecting paths in multi-stage cross-point type networks and more particularly, with node control circuitry for use in controlling the cross-point switching devices utilized in the network.

The communication industry is continually striving to obtain more economical and efficient path selection systems. This striving for perfection in path selection systems has been given added impetus in the recent past by the use of the communication systems for transmitting data as well as voice communications. Improvements have been realized in the switching networks because of the utilization of solid state cross-points.

The solid state cross-points have been used in the past in what is commonly known as self-seeking networks. In the self-seeking system of path selection, control voltages are placed at the calling input of the network and at the desired called output. The voltage differences between the input potential and the output potential cause breakdowns in the solid state devices which extend from the input to the output in a purely random manner. On a small scale, no intermediate control circuitry is required.

This type of self-seeking network has been plagued with various inherent problems. For example, the breakdown point of the solid state devices, such as PNPN diodes, used in the self-seeking network is a function of both signal amplitude and signal rate. Further, the PNPN diodes used in such matrices are relatively expensive and not sufficiently reliable because of the narrow acceptable diode tolerances required.

Another limitation in networks using solid state cross-points is due to the inherent characteristics of the cross-points elements wherein transients cause false switching of the cross-points. The transients may be caused by pulses used in the transmission of data or telegraphic signals.

To overcome these difficulties switching devices which separate the control and load circuits are now utilized. Reed relays and silicon controlled rectifiers are two examples of switching devices now utilized wherein the control circuitry and the load circuits are not common. These types of switching devices require control circuitry. It has been found in the past that control circuits for the switching elements have caused voice attenuation due to power drain. Additionally, the control circuitry used in the past tends to hold lines busy after release by the parties because of inefficient current control. Further, the switching through of the switching elements drew an extra heavy current through the control circuit because of the change of potential on the matrix path. The heavy current, besides being a drain on the power source, also tends to hold the following circuits switched through even after they should have been released.

Accordingly, an object of this invention is to improve the path selection system through multi-stage, cross-point type networks.

A related object of this invention is to provide new control circuitry for controlling the cross-point elements, especially when these cross-point elements are solid state devices wherein the control and load circuitry are separated from each other.

Yet another object of this invention is to provide such control circuitry that minimizes voice attenuation.

Yet another object of this invention is to provide switching element control circuitry wherein relatively low voltage levels can be used.

Still another object of this invention is to provide means for positively turning off the switching element at the cross-point after the test had been made in attempting to complete the paths through that particular element.

Yet another object of the invention is to provide means for isolating the control circuitry from the speech path.

Still another object of the invention is to provide means for assuring that unused matrix-paths are not held busy through the node control circuit due to a lack of current control. Therefore, the circuitry includes means for providing closer control of the current used in controlling the switching elements.

A preferred embodiment of the invention comprises a node control circuit using amplifier means to distinguish between a reference voltage and the voltage of the line at a test point on the link side of the switching elements. When the matrix voltage at the test point varies from reference voltage by a given amount, the level-detector provides a signal at its output. The output of the level-detector is fed through a node control gate to an amplifier. The output of the amplifier is used to turn on a switching element which in the preferred embodiment is a silicon controlled rectifier. The other input to the node control gate is derived from a scanner gate driven by a counter-like scanner to enable a square wave signal therethrough. The square wave signal acts to prevent fan out through the matrix, because it assures the prompt release of the stages switched on, but not switched through. A constant current source powers the node control test circuit and isolating means separate the control circuits and the controlled circuits.

The above mentioned and other objects and features of the invention and the manner of obtaining them will become more apparent and the invention itself will be best understood by making reference to the following description of an embodiment of the invention taken in conjunction with the accompanying drawing wherein.

Figure 1:
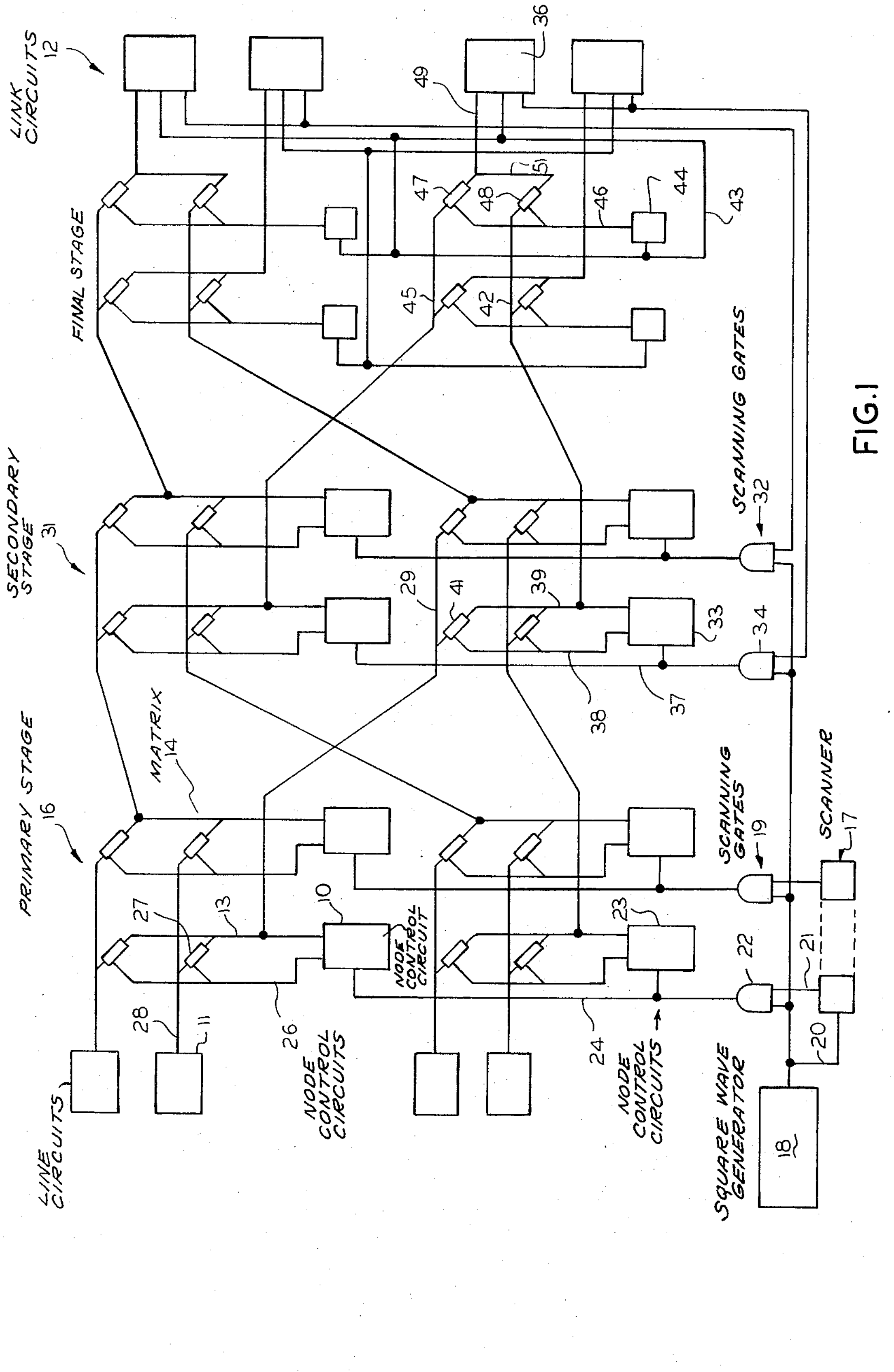
FIG. 1 is a block diagram of a preferred embodiment of a scanner controlled path selection system showing line circuits at the input, link circuits at the output and node control circuits used for controlling the switching elements.

As shown in FIG. 1 the horizontal multiples represent the inputs of the respective stages, and the vertical multiples represent the outputs of the respective stages. Thus, the verticals of the preceding stages are coupled to the horizontals of the successive stages through the switching elements. There may be a larger number of matrices per stage than is illustrated in FIG. 1; however, for the purposes of simplicity in describing the invention, only two matrices per stage are shown. Similarly, while in actuality each matrix may have a plurality of horizontals and verticals; nonetheless, only the first and last horizontals are shown for each of the matrices. Also, while there are two appearances for each link at the output of the matrix, one for the originating party and one for the terminating party, for simplicity only one appearance is shown in FIG. 1.

The overall use of the invention is shown in FIG. 1 wherein the node control circuits such as node control circuit 10 are shown coupled to switching elements to oversee the interconnections of the verticals and the horizontals. Thus, the node control circuits function to control the switching of paths through the stages of the switching network from the line circuit, such as line circuit 11, for example, to the output circuits, such as link circuits 12, coupled to the outputs of the tertiary stage, or the last stage, if there are more than three stages in the network.

It should be noted that while link circuits are shown as coupled to the outputs, other types of circuits such as registers could replace the link circuits.

The control circuit 10 acts to enable vertical 13 of matrix 14 in the primary stage 16. One of the functions of the control circuit is to block, or busy out any vertical while that vertical is being used in a selected path. This is accomplished by testing the verticals to see if they are idle and available for use in a path. If the test shows that the path is available, the control circuit acts to switch the cross-point element to complete the path. Also, the control circuit acts to disconnect the verticals by returning the switching elements to normal when the path is no longer in use.

Means are provided for actuating the control circuits that are coupled to the verticals of the first stage. More particularly, a counter-like scanner is depicted by the block 17 at the bottom of the page which services all of the control circuits in the first stage 16. The counter-like scanner 17 actuates the control circuits in a sequential manner in conjunction with a square wave generator 18 and gates 19. For example, when the scanner provides a signal on lead 21, then gate 22 is enabled so that the signal from the square wave generator is provided to the control circuits 10 and 23 over lead 24. The positive going square wave signal on lead 24 causes the control circuits, such as control circuit 10, to apply a cross-point switching element enabling signal over lead 26 to the crosspoint switching elements, such as switching element 27. If vertical 13 and horizontal 28 are idle or if vertical 13 is idle, and there is a demand for service signal on horizontal 28 coming from line circuit 11, then switching element 27 switches to its conducting state and connects vertical 13 to horizontal 28. When line circuit 11 is a calling line, then the demand for services signal of horizontal 28 is transferred to horizontal 29 in the secondary stage 31. The scanning gates 32 of the secondary stage are actuated by signals from the links 12 and operate the control circuits, such as control circuit 33 in the second stage in the same manner as the control circuits of the first stage. Thus, when gate 34 is actuated by a signal from an allotted link, such as link 36, then the square wave pulse is transmitted over lead 37 causing a switch actuating signal on lead 38 to interconnect vertical 39 with horizontal 29 through switching element 41.

The demand for service signal (which may be a negative voltage) applied by the line circuit is now extended to horizontal 42 of the tertiary stage. Link 36 transmits a control circuit actuating signal over lead 43, which causes control circuit 44 to transmit a switching signal over lead 46 to crosspoint switching elements 47 and 48. An idle condition signal transmitted by link 36 over lead 49 at this time causes switching element 48 to switch through. Switching element 47 remains unswitched because there is insufficient potential difference between horizontal 45 and vertical 51. Note that the square wave generator signal operates the primary and secondary stages in a preferred embodiment of this invention. The period of the square wave generator in the preferred embodiment is 200 microseconds with a 100 microsecond enable signal and a 100 micro second inhibit period. Basically the criteria is that the enable pulse must be long enough to fire the SCR switching elements. The inhibit period must be long enough to release the SCR switching elements before another path is enabled. The utilization of the square wave pulse to actuate the node control circuits minimizes fan out, during the search for a path through the matrices.

Figure 2:
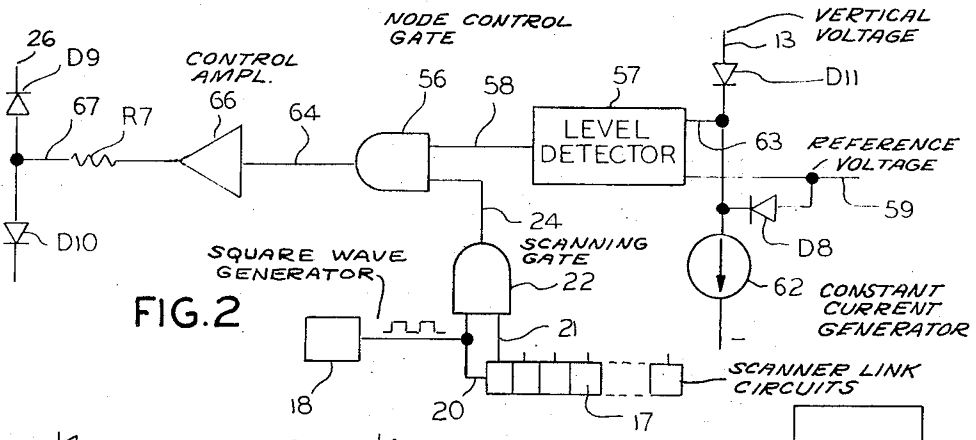
FIG. 2 is a block diagram of the invention node control circuitry.

Turning now to FIG. 2, therein is shown in block diagram from the operation of the node control circuit. The square wave generator 18 is shown connected to gate 22. The scanner 17 applies a signal to the other input of gate 22 over lead 21. The scanner 17 is actuated to provide sequential signals at its outputs by the signal from the signal generator 18 over lead 20. The output of gate 22 on lead 24 is coupled to a gate circuit 56 within the node control circuit. The other signal at the input of gate 56 comes from a level detector 57 over lead 58. The level detector 57 compares the level of the signal on the verticals, such as vertical 13, with the level of reference signal received over lead 59. Vertical 13 is isolated from the level detector by diode D11 for purposes of preventing the level detector from attenuating the mark pulse which is intended to switch the matrix.

The node control circuit is provided with a constant current by a constant current generator 62. The output of the current source 62 is clamped to lead 59 by diode D8. This enables vertical 13 to be marked from the current source 62. When vertical 13 is in its idle condition, then there is sufficient difference between the signals on inputs 59 and 63 of level detector 57 to cause the output from the level detector to reach a certain desired level. The output from the level detector is transmitted over lead 58 to node control gate 56. If, at the same time, there is a signal on lead 24 from scanning gate 22, then the output of the gate 56 is transmitted via amplifier 66, resistor R7, lead 67 diode D9 and lead 26 to cause the switching element to be enabled. When there is no signal on lead 64, then diode D9 is back biased as will be explained in greater detail in the description of FIG. 3.

Figure 3:
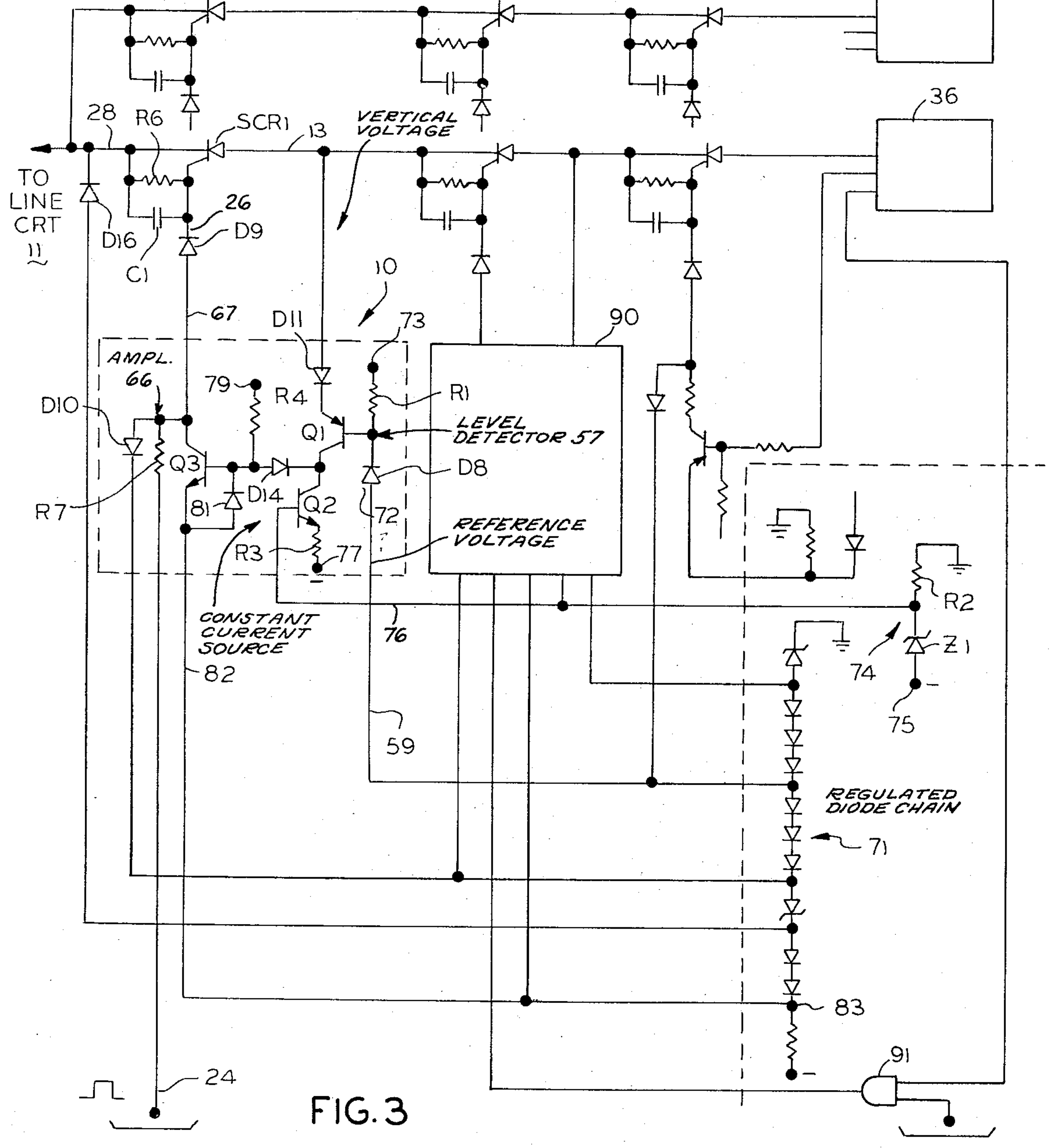
FIG. 3 is a schematic showing of the node control circuit along with the actual switching elements of a three stage matrix network.

FIG. 3 schematically shows the node control circuit 10 in a three-stage matrix arrangement. Wherever possible the identical numbers as were used in the description of FIG. 1 and FIG. 2 will be used. In FIG. 3 the square wave output of gate 22 is assumed to be on lead 24. The reference input to the level detector is shown as being connected through lead 59 coming from regulated diode chain 71 through an isolating diode D8. The level detector comprises transistor Q1 shown as a PNP type transistor. The base of transistor Q1 is biased by negative voltage at point 73 through resistor R1. The emitter of transistor Q1 is coupled to vertical 13 through isolating diode D11. The collector of transistor Q1 is connected to a constant current source.

The constant current source comprises transistor Q2 which is shown as an NPN type transistor. The base of transistor Q2 is connected to a source of regulated negative voltage. A zener diode Z1 connects the negative voltage at point 75 to the resistor R2 and provides biasing current. The junction of zener Z1 and resistor R2 is connected directly to the base of transistor Q2 over lead 76. The emitter of transistor Q2 is connected to negative voltage at point 77 through resistor R3. The collector of transistor Q2 is connected directly to the collector of transistor Q1. The junction of the collectors of transistors Q1 and Q2 are connected to the base of amplifying transistor Q3 through diode D14. More particularly, the anode of diode D14 is connected to the base of transistor Q3 while the cathode of diode D14 is connected to the collectors of transistors Q1 and Q2.

The transistor Q3 is an NPN type transistor. Bias voltage for the base of transistor Q3 is obtained from positive voltage source at point 79 through resistor R4, diode 81 and lead 82 connected to negative voltage at point 83. The negative voltage comes from the regulated diode string 71. The emitter of transistor Q3 is coupled to lead 82. The collector of transistor Q3 is connected to the switching element over lead 26. In a preferred embodiment of the invention, the switching element comprises silicon controlled rectifiers, such as SCR 1 with lead 26 connected to the gate of the silicon control rectifier SCR 1 through diode D9. Lead 26 is coupled to the cathode of SCR 1 through resistor R6. A filter capacitor C1 bridges resistor R6 and acts to reduce the noise sensitivity of the silicon controlled rectifier.

The cathode of SCR 1 is also connected to horizontal 28 coming from line circuit 11.

Means in the line circuit (not shown) are provided to maintain horizontal 28 at a ground potential while the line circuit is idle. When SCR 1 switches through a negative signal on line circuit 11 is transmitted through to vertical 13. However, as long as vertical 13 is relatively positive, then this positive voltage is indicative of a busy condition and the node control circuit 10 will not switch SCR 1.

When vertical 13 is negative, then transistor Q1 operates to switch transistor Q3 off. With transistor Q3 switches off a positive pulse on line 24 is transmitted through resistor R7 and diode D9 to the gate input of SCR 1. The voltage drop across the SCR 1, is sufficient under these conditions to cause SCR 1 to conduct. When SCR 1 conducts, vertical 13 goes to a more negative voltage extended from the line circuit. When the matrix path has switched completely through to the link, then the voltage on vertical 13 is a positive voltage obtained from the link.

A diode D16 is provided to clamp the horizontal 28 at negative 12.8 volts. This acts to prevent the SCR switching elements from switching when the node control circuit has not been enabled. The positive pulse on line 24 is transmitted through resistor R7, lead 26 and diode D9 to the gate of SCR 1. The positive pulse transmitted over line 24 and resistor R7 is clamped by diode D10 such that the pulse appearing on line 26 cannot move above the potential appearing at the point on the diode chain 71 where the cathode of diode D10 is connected. This prevents the SCR's from being switched unless a relatively negative marking pulse is extended from the line circuit.

The other node control circuits such as node control circuit 90 operates in a similar manner, except that the positive pulse is derived through a gate 91 actuated by a link circuit, such as link circuit 36. In this manner a path is established through the matrix with a minimum of fan out and a minimum of control circuitry. If a portion of the matrix is switched through and reaches a dead end, the switched through portions release, when the output of square wave generator 18 goes low. During that period of time gates, such as gate 22 are inhibited. This causes a partially connected matrix path to release.

While the principles of the invention have been described above in connection with specific apparatus and applications, it is to be understood that this description is made only by way of example and not as a limitation on the scope of the invention.

I claim:

1. A node control circuit arrangement for controlling switchable three terminal cross point elements at the nodes interconnecting multiples in matrices arranged in multi-stage networks, said multi-stage networks being connected to be controlled at each node by node control circuits common to a plurality of cross point elements in each of said stages, said node control circuits comprising test means including differential level detector means connected to determine the signal condition of a multiple being tested at a test point on one side of the switchable cross point elements, said differential level detector means providing an output signal when the signal at the said one side varies from a reference signal by a pre-determined amount, said test means further comprising constant current generator means coupled to said test point for limiting the current flow at said test point to thereby minimize attenuation by said test means, said node control circuit arrangement further including scanner means for sequentially supplying scanner signals to the node control circuit in at least some of the stages of said multi-stage network, and node control gate means operated responsive to the simultaneous receipt of said output signal from said level detector and said scanner signals to provide a cross point element switching signal for switching said cross point element.

2. The node control circuit arrangement of claim 1 wherein said scanner signals are coupled to said node control gate means in a desired time frame relative to other node control circuits, control amplifier means connected to the output of said node control gate means, and said control amplifier means normally operated to prevent the switchable cross point elements from conducting but operated responsive to the receipt of the switching signal from said node control gate means to switch on said cross point switchable element.

3. The node control circuit arrangement of claim 2 wherein said scanner means comprises scanner gate means, square wave generator means coupled to one input of said scanner gate means to provide a square wave signal output from said scanner gate means when said scanner gate means is enabled, and sequential counter means having at least one output thereof coupled to said scanner gate means to enable said scanner gate within the desired time frame thereby providing a square wave signal to said first gate means.

4. The node control circuit of claim 1 wherein said test means further comprises level detector means having two inputs, means for connecting reference signal means to one input of said level detector, means for connecting the test point to another input of said level detector, and said constant current means and said one input of said level detector coupled through blocking diode means to said test point.

5. The node control circuit arrangement of claim 4 wherein clamping means are provided to clamp said reference signal input connection to said constant current means.

6. The node control circuit arrangement of claim 5 wherein said level detector means comprises first normally non-conducting transistor means, coupling means including said first diode for coupling said first transistor between said test point and said constant current source, means for coupling the base of said first transistor to said reference voltage, the output of said first transistor being coupled to said first gate means, and said normally non-conducting first transistor means operated to conduct and provide an output signal responsive to the signal at said test point being at a predetermined level.

7. The node control circuit arrangement of claim 2 wherein said switching elements comprise silicon controlled rectifiers, said control circuit arrangement normally providing a negative signal to the node control gate means to prevent the operation of said control amplifier, means responsive to a sequentially received square wave pulse in conjunction with the signal from said differential level detector to switch one of said silicon controlled rectifiers to the conducting state, and means responsive to the removal of said positive pulse when there is no signal from said differential level detector for immediately switching off said switched one of said silicon controlled rectifiers.

8. The node control circuit arrangement of claim 1 wherein said switchable element comprises silicon controlled rectifiers, and means for reducing noise sensitivity of said silicon controlled rectifier.

9. The node control circuit arrangement of claim 8 wherein said noise sensitivity reducing means comprises a parallel resistor capacitor network coupled between the gate and cathode of said silicon controlled rectifier.

10. The switching system of claim 1 wherein said scanner signals are square wave signals.

* * * * *